United States Patent
Imai et al.

(10) Patent No.: US 9,023,949 B2
(45) Date of Patent: May 5, 2015

(54) PHOTOCURABLE COMPOSITION

(71) Applicant: Three Bond Fine Chemical Co., Ltd., Kanagawa (JP)

(72) Inventors: Yusuke Imai, Kanagawa (JP); Naoya Otsuki, Kanagawa (JP); Huo Chuanjia, Kanagawa (JP)

(73) Assignee: Three Bond Fine Chemical Co., Ltd., Kanagawa (JP)

( * ) Notice: Subject to any disclaimer, the term of this patent is extended or adjusted under 35 U.S.C. 154(b) by 0 days.

(21) Appl. No.: 14/199,601

(22) Filed: Mar. 6, 2014

(65) Prior Publication Data
US 2014/0256882 A1    Sep. 11, 2014

(30) Foreign Application Priority Data
Mar. 8, 2013   (JP) .................................. 2013-046060

(51) Int. Cl.
*C08L 47/00*   (2006.01)

(52) U.S. Cl.
CPC ..................................... *C08L 47/00* (2013.01)

(58) Field of Classification Search
CPC ....................................................... C08L 47/00
USPC ................................................. 525/63, 223
See application file for complete search history.

(56) References Cited

U.S. PATENT DOCUMENTS

| 7,927,533 | B2 | 4/2011 | Kamiya et al. |
| 2010/0003425 | A1* | 1/2010 | Kamata et al. ................. 428/1.5 |
| 2010/0118245 | A1* | 5/2010 | Toyoda et al. ................. 349/122 |
| 2014/0320770 | A1* | 10/2014 | Motohashi et al. ............. 349/12 |

FOREIGN PATENT DOCUMENTS

| JP | 2004-077887 | | 3/2004 |
| JP | 2009-186955 | | 8/2009 |
| JP | 2012144634 A | * | 8/2012 |
| WO | 2008/123611 | | 10/2008 |
| WO | WO 2013/084503 | * | 6/2013 |

* cited by examiner

*Primary Examiner* — Mark Kaucher
(74) *Attorney, Agent, or Firm* — Roylance, Abrams, Berdo & Goodman, L.L.P.

(57) ABSTRACT

Conventionally, a photocurable resin can be used for forming a soft cured product but is difficult to have thick film curability and exhibit moisture resistance.
A photocurable composition containing components (A) to (D), in which a ratio of a (meth)acrylate monomer having an aromatic group in the component (C) is 30 to 100%:
  the component (A): an isoprene polymer having a (meth) acrylic group,
  the component (B): an isoprene polymer having a hydroxyl group,
  the component (C): at least one kind of (meth)acrylate monomers selected from a (meth)acrylate monomer having an aromatic group and an alkyl (meth)acrylate monomer, and
  the component (D): a hydrogenated terpene resin.

5 Claims, No Drawings

PHOTOCURABLE COMPOSITION

TECHNICAL FIELD

The present invention relates to a photocurable composition which is cured by irradiation with light. More specifically, the invention relates to a photocurable composition which is capable of forming a soft cured product with high moisture resistance, and is excellent in thick film curability.

BACKGROUND ART

As described in Patent Literature 1 (JP 2004-077887 A), a conventional technology is known in which a soft photocurable resin is filled between a touch panel and a display element when a display panel provided with the touch panel is assembled. The photocurable resin functions as a buffer material for protecting the display panel from stress. In addition, in displays for televisions or personal computers, a photocurable resin is also used to be filled between a display element and a protection layer made of an acrylic plate or a glass plate. However, since a refractive index of an adherend is changed depending on a material of the adherend, a refractive index of the photocurable resin needs to be changed so as to match the refractive index of the adherend, from the viewpoint of optical properties. The refractive index of the photocurable resin is determined according to a raw material and composition of the photocurable composition before curing. Therefore, in the photocurable composition, it is difficult to balance physical properties such as heat resistance and moisture resistance with optical properties while adjusting optical properties. In particular, there is known a case where, when the photocurable resin absorbs moisture, the photocurable resin becomes cloudy and thus optical properties are decreased or a case where the photocurable resin becomes yellow due to heat. On the other hand, in order to improve heat resistance (in an atmosphere at 60° C. for 1,000 hours) or moisture resistance (in an atmosphere at 85° C.×85 RH % for 1,000 hours), it is preferable to increase a glass transition temperature. However, at this time, there is a concern in yellow discoloration of the cured product. Moreover, it is assumed that the cured product does not function as a buffer material because the cured product becomes harder such. Therefore, there is a problem in the balance between optical properties and physical properties.

In addition, when an oligomer having a long main skeleton and a small number of (meth)acrylic groups included per one molecule is used in a soft photocurable resin, a cured product becomes softer. However, photocurability is decreased due to the structure. According to this, a non-cured portion may remain depending on ways of irradiation with light and a film thickness of the cured product may also be very thin. As described in Patent Literature 2 (JP 2009-186955 A, WO 2008/123611 A), a shadow zone is not cured unless a method of irradiation with light from the side surface of a display element is employed. Moreover, even in the case of irradiation with light from a touch panel side, the light irradiation is partially absorbed at a touch panel member and thus an integrated light amount of light reaching to the photocurable resin is decreased. Therefore, there is a concern in that, when thick film curability is low, a cured state is unstable. Moreover, in the case of a display panel in which a touch panel is used as an outermost layer or a protection layer is used instead of the touch panel, if a refractive index of the outermost layer and a refractive index of the photocurable resin do not match with each other, optical properties cannot be achieved. Therefore, when one kind of the photocurable resin is used, it is not possible to achieve sufficient optical properties with respect to any types of the outermost layer.

SUMMARY OF INVENTION

The invention is intended to provide a photocurable composition which is capable of forming a soft cured product with high moisture resistance, and is excellent in thick film curability.

Present inventors conducted intensive studies to achieve the object described above. As a result, it was found that a photocurable composition with desirable properties can be obtained by mixing predetermined components to be described below.

That is, a photocurable composition of the invention contains the following components (A) to (D):

the component (A): an isoprene polymer having a (meth)acrylic group, the component (B): an isoprene polymer having a hydroxyl group, the component (C): at least one kind of (meth)acrylate monomers selected from a (meth)acrylate monomer having an aromatic group and an alkyl (meth)acrylate monomer, and the component (D): a hydrogenated terpene resin.

DESCRIPTION OF EMBODIMENTS

A photocurable composition of the invention contains the following components (A) to (D):

the component (A): an isoprene polymer having a (meth)acrylic group, the component (B): an isoprene polymer having a hydroxyl group, the component (C): at least one kind of (meth)acrylate monomers selected from a (meth)acrylate monomer having an aromatic group and an alkyl (meth)acrylate monomer, and the component (D): a hydrogenated terpene resin.

According to the invention, it is possible to provide a photocurable composition which does not generate curing unevenness and is excellent in curability in a shadow zone because the photocurable composition has excellent thick film curability in spite of forming a soft cured product. Moreover, since the photocurable composition has a high moisture resistance, excellent optical properties can be exhibited without causing white turbidity. Particularly, the photocurable composition of the invention is preferably used to seal a display panel having a protection layer made of alkali-free glass, which does not contain an alkaline component, such as sodium and potassium.

Hereinafter, details of the invention will be described. Here, the term "(meth)acryl" used in this specification means any one or both of "acryl" and "methacryl". Moreover, the "photocurable composition" is also simply referred to as a "composition."

In the invention, the component (A) is an isoprene polymer having a (meth)acrylic group. A binding position of the (meth)acrylic group is not particularly limited, and the binding position thereof may be a terminal or the inside of a main skeleton of the isoprene polymer. As the component (A), specifically, "UC-203" and "UC-102" manufactured by Kuraray Co., Ltd., and the like are known, but the component (A) is not limited thereto. Moreover, two or more kinds of these may be used in combination.

In the invention, the component (B) is an isoprene polymer having a hydroxyl group and means a compound other than the component (A) (that is, an isoprene polymer having a hydroxyl group but not having a (meth)acrylic group). Specifically, "Poly ip" manufactured by Idemitsu Kosan Co., Ltd., "TL-20" manufactured by Kuraray Co., Ltd., and the like are known, but the component (B) is not limited thereto. Moreover, two or more kinds of these may be used in combination.

The content of the component (B) added is preferably 100 to 800 parts by mass, and more preferably 100 to 600 parts by mass with respect to 100 parts by mass of the component (A). If the content of the component (B) is 100 parts by mass or more, an elongation percentage of the cured product is improved and a hardness thereof can be lowered (that is, a soft cured product can be obtained). If the content of the component (B) is 800 parts by mass or less, excellent photocurability is exhibited.

In the invention, the component (C) is at least one kind of (meth)acrylate monomers selected from a (meth)acrylate monomer having an aromatic group and an alkyl (meth)acrylate monomer and means a compound other than the component (A). Incidentally, the (meth)acrylate monomer is a compound having at least one (meth)acrylic group in one molecule. Since the component (C) is used for diluting the component (A) and the component (B) which have a high viscosity so as to lower a viscosity of the composition, a molecular weight of the component (C) is preferably 1,000 or less. In the invention, a ratio of the (meth)acrylate monomer having an aromatic group in the component (C) is preferably 30 to 100% by mass (at this time, a ratio of the alkyl (meth) acrylate monomer is preferably 0 to 70% by mass), and more preferably 40 to 80% by mass (at this time, a ratio of the alkyl (meth)acrylate monomer is preferably 20 to 60% by mass). The refractive index of the cured product can be adjusted according to the type or ratio of the (meth)acrylate monomer in the component (C). In particular, when the ratio of the (meth)acrylate monomer is within the above range, a cured product having a refractive index similar to a glass plate can be obtained.

The (meth)acrylic monomer having an aromatic group means a (meth)acrylic monomer having at least one aromatic group in the molecule (but, excluding the component (A)). Specific examples of the (meth)acrylic monomer include benzyl (meth)acrylate, phenoxyethyl (meth)acrylate, and the like, but the (meth)acrylic monomer is not limited thereto. Moreover, two or more kinds of these may be used in combination.

The alkyl (meth)acrylate monomer may be either a linear alkyl (meth)acrylate monomer or a branched alkyl (meth)acrylate monomer. Specific examples of the alkyl (meth)acrylate monomer include methyl (meth)acrylate, ethyl (meth)acrylate, n-butyl (meth)acrylate, isobutyl (meth)acrylate, t-butyl (meth)acrylate, 2-ethylhexyl (meth)acrylate, isodecyl (meth)acrylate, n-lauryl (meth)acrylate, n-stearyl (meth)acrylate, and the like. Among these, an alkyl (meth) acrylate monomer having 10 to 20 carbon atoms is preferably used, and a linear alkyl (meth)acrylate monomer having 10 to 20 carbon atoms is more preferably used. Specifically, n-lauryl (meth)acrylate and n-stearyl (meth)acrylate are preferably used, but the alkyl (meth)acrylate monomer is not limited thereto. Moreover, two or more kinds of these may be used in combination.

The content of the component (C) added is preferably 100 to 400 parts by mass, and more preferably 150 to 350 parts by mass with respect to 100 parts by mass of the component (A). If the content of the component (C) is 400 parts by mass or less, excellent photocurability is exhibited. If the content of the component (C) is 100 parts by mass or more, it is possible to prevent a viscosity of the photocurable composition from being increased too much. Incidentally, a viscosity of the photocurable composition is preferably 1,000 to 3,000 mPa·s by diluting with the component (C).

In the invention, the component (D) is a hydrogenated terpene resin. The hydrogenated terpene resin is one obtained by reducing an unsaturated bond, which remains in the molecule of a terpene resin, to a saturated state. Incidentally, as the terpene resin, a terpene resin modified by an aromatic ring such as phenol is also included in addition to a terpene resin synthesized only from a terpene skeleton. From the viewpoint of solubility with respect to other components (the components (A) to (C)), a melting point of the component (D) is preferably 150° C. or lower. As a specific example, "Clearon P85, P105, and P115" manufactured by YASUHARA CHEMICAL CO., LTD., and the like are known, but the terpene resin is not limited thereto. Moreover, two or more kinds of these may be used in combination.

The content of component (D) added is preferably 200 to 500 parts by mass, and more preferably 250 to 450 parts by mass, with respect to 100 parts by mass of the component (A). If the content of the component (D) is 500 parts by mass or less, it is possible to prevent a case where adhesiveness is decreased caused by a high elongation percentage. If the content of the component (D) is 200 parts by mass or more, it is possible to prevent a case where an elongation percentage is lowered excessively or a case where hardness is increased excessively and thus a cured product is hardened.

For the purpose of giving photocurability, a photoinitiator may be used as a component (E) in the invention. The photoinitiator is not particularly limited, as long as it is a radical photoinitiator which generates radical species by an energy line such as a visible light ray, an ultraviolet ray, an X-ray, and an electron ray. Specific examples include acetophenones such as diethoxy acetophenone, 2-hydroxy-2-methyl-1-phenylpropane-1-one, benzyl dimethyl ketal, 4-(2-hydroxy ethoxy)phenyl-(2-hydroxy-2-propyl) ketone, 1-hydroxycyclohexyl phenyl ketone, 2-methyl-2-morpholino(4-thiomethylphenyl) propane-1-one, 2-benzyl-2-dimethylamino-1-(4-morpholinophenyl) butanone, and 2-hydroxy-2-methyl-1-[4-(1-methyl vinyl)phenyl]propanone oligomer; benzoins such as benzoin, benzoin methyl ether, benzoin ethyl ether, benzoin isopropyl ether, and benzoin isobutyl ether; benzophenones such as benzophenone, methyl o-benzoylbenzoate, 4-phenyl benzophenone, 4-benzoyl-4'-methyl-diphenyl sulfide, 3,3',4,4'-tetra(t-butyl peroxycarbonyl)benzophenone, 2,4,6-trimethyl benzophenone, 4-benzoyl-N,N-dimethyl-N-[2-(1-oxo-2-propenyloxy)ethyl]benzene methanaminium bromide, and (4-benzoylbenzyl)trimethylammonium chloride; thioxanthones such as 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4-dimethyl-9H-thioxanthone-9-one mesochloride; and the like, but the photoinitiator is not limited thereto.

In replacement of the radical photoinitiator or together with the radical photoinitiator, a cationic photoinitiator may be used as the component (E). Specific examples of the cationic photoinitiator include a diazonium salt, a sulfonium salt, an iodonium salt, and the like. Specifically, benzenediazonium hexafluoroantimonate, benzenediazonium hexafluorophosphate, benzenediazonium hexafluoroborate, triphenylsulfonium hexafluoroantimonate, triphenylsulfonium hexafluorophosphate, triphenylsulfonium hexafluoroborate, 4,4'-bis[bis(2-hydroxyethoxy phenyl) sulfonio]phenyl sulfide bis hexafluorophosphate, diphenyl iodonium hexafluoroantimonate, diphenyl iodonium hexafluorophosphate, diphenyl-4-thiophenoxy phenyl sulfonium hexafluorophosphate, and the like may be exemplified, but the cationic photoinitiator is not limited thereto. Moreover, as for the radical photoinitiator and the cationic photoinitiator, only one kind may be used singly or two or more kinds may be used in combination.

The content of component (E) added is preferably 5 to 40 parts by mass, and more preferably 10 to 30 parts by mass, with respect to 100 parts by mass of the component (A). If the content of the component (E) is 5 parts by mass or more, photocurability is improved. Meanwhile, if the content of the component (E) is 40 parts by mass or less, a viscosity is not increased during storage and thus storage stability can be maintained.

In the composition of the invention, a polymerization inhibitor can be also used to maintain storage stability in addition to the above-described components. However, if an addition amount of the polymerization inhibitor is too large, the storage stability is improved, but reactivity becomes lower. Therefore, an addition amount of the polymerization inhibitor is preferably 0.001 to 0.1% by weight. Specific examples of the polymerization inhibitor include a quinone-based polymerization inhibitor such as hydroquinone, methoxyhydroquinone, benzoquinone, and p-tert-butylcatechol; an alkylphenol-based polymerization inhibitor such as 2,6-di-tert-butylphenol, 2,4-di-tert-butylphenol, 2-tert-butyl-4,6-dimethylphenol, 2,6-di-tert-butyl-4-methylphenol, and 2,4,6-tri-tert-butylphenol; an amine-based polymerization inhibitor such as alkylated diphenylamine, N,N'-diphenyl-p-phenylenediamine, phenothiazine, 4-hydroxy-2,2,6,6-tetramethylpiperidine, 4-benzoyloxy-2,2,6,6-tetramethylpiperidine, 1,4-dihydroxy-2,2,6,6-tetramethylpiperidine, and 1-hydroxy-4-benzoyloxy-2,2,6,6-tetramethylpiperidine; an N-oxyl-based polymerization inhibitor such as 2,2,6,6-tetramethylpiperidine-N-oxyl, 4-hydroxy-2,2,6,6-tetramethylpiperidine-N-oxyl, and 4-benzoyloxy-2,2,6,6-tetramethylpiperidine-N-oxyl; and the like, but the polymerization inhibitor is not limited thereto. Moreover, two or more kinds of these may be used in combination.

The composition of the invention may be mixed in an appropriate amount with an additive such as an inorganic filler (for example, calcium carbonate, talc, silica, alumina, aluminum hydroxide, and the like), a flame retardant, an organic filler, a plasticizing agent, an antioxidant, a defoaming agent, a coupling agent, a leveling agent, and a rheology control agent, within a range without impairing the features of the invention. By adding these, it is possible to obtain a composition, which is excellent in resin strength, adhesion strength, workability, a preserving property, or the like, and a cured product thereof.

The composition of the invention is preferably used as a sealant in a case where a display panel such as a liquid crystal display panel has a protection layer made of alkali-free glass. Therefore, according to another embodiment of the invention, it is possible to provide a sealant which contains the photocurable composition and is suitable for a display panel having a protection layer made of alkali-free glass. The refractive index of the sealant is similar to a refractive index (1.51 to 1.52) of the alkali-free glass. According to this, when the alkali-free glass is used as an adherend, excellent optical properties can be exhibited.

EXAMPLES

Hereinafter, the invention will be described in detail by exemplifying Examples, but the invention is not limited only to these Examples.

In order to prepare a composition, the following components were prepared.

Component (A): an isoprene polymer having a (meth)acrylic group
  Esterified substance of a maleic anhydride adduct of an isoprene polymer and 2-hydroxyethyl methacrylate (UC-203, manufactured by Kuraray Co., Ltd.)
Component (B): an isoprene polymer having a hydroxyl group
  Polyisoprene having a hydroxyl group in a molecular end (Poly ip, manufactured by Idemitsu Kosan Co., Ltd.)
Component (B'): a polymer other than the component (B)
  Maleic anhydride adduct of an isoprene polymer (LIR-403, manufactured by Kuraray Co., Ltd.)
  Polybutadiene having a hydroxyl group in a molecular end (Poly BD, manufactured by Idemitsu Kosan Co., Ltd.)
  Polyisoprene having a molecular weight of 28,000 (LIR-30, manufactured by Kuraray Co., Ltd.)
  Polyisoprene having a molecular weight of 54,000 (LIR-50, manufactured by Kuraray Co., Ltd.)
  Polybutadiene having a molecular weight of 1,100 (B-1000, manufactured by Nippon Soda Co., Ltd.)
  Polybutadiene having a molecular weight of 3,200 (B-3000, manufactured by Nippon Soda Co., Ltd.)
Component (C): at least one kind of (meth)acrylate monomers selected from a (meth)acrylate monomer having an aromatic group and an alkyl (meth)acrylate monomer
  Benzyl acrylate (FA-BZA, manufactured by Hitachi Chemical Company, Ltd.)
  Lauryl acrylate (LIGHT ACRYLATE L-A, manufactured by Kyoeisha Chemical Co., Ltd.)
Component (C'): a (meth)acrylate monomer other than the component (C)
  Isobornylacrylate (LIGHTACRYLATE IB-XA, manufactured by Kyoeisha Chemical Co., Ltd.)
  Isobornylmethacrylate (LIGHT ESTER IB-X, manufactured by Kyoeisha Chemical Co., Ltd.)
  Dicyclopentenyloxyethyl methacrylate (FA-512M, manufactured by Hitachi Chemical Company, Ltd.)
  2-Hydroxypropyl acrylate (LIGHT ESTER HOP-A, manufactured by Kyoeisha Chemical Co., Ltd.)
  2-Hydroxyethyl methacrylate (HEMA, manufactured by NIPPON SHOKUBAI CO., LTD.)
  4-Hydroxybutylacrylate (4HBA, manufactured by Nippon Kasei Chemical Co., Ltd.)
  Acryloylmorpholine (ACMO, manufactured by KOHJIN Film & Chemicals Co., Ltd.)
  Dimethylacrylamide (DMAA, manufactured by KOHJIN Film & Chemicals Co., Ltd.)
Component (D): a hydrogenated terpene resin
  Terpene hydrogenated product having a melting point of 85° C. (Clearon P85, manufactured by YASUHARA CHEMICAL CO., LTD.)
  Terpene hydrogenated product having a melting point of 105° C. (Clearon P105, manufactured by YASUHARA CHEMICAL CO., LTD.)
Photoinitiator
  1-Hydroxycyclohexyl phenyl ketone (IRGACURE 184, manufactured by BASF).

Reference Examples 1 to 10

The component (A) and the component (C) (or the component (C')) were weighted and stirred for 30 minutes. The detailed preparation amounts were based on the description presented in Table 1 and all numerical values were indicated by part (s) by mass. In addition, compatibility confirmation and viscosity measurement were performed and then the results thereof were also presented together in Table 1.

[Compatibility Confirmation]

A sample was poured into a test tube (a glass apparatus for chemical analysis) having a diameter of 15 mm corresponding to JIS R 3503 or a tube having a shape equal to that of the test tube so as to have a depth of 50 mm or more, and the sample was picked up at eye level. The sample was visually confirmed in an entering direction of light and a dark direction. The confirmation on whether the sample is transparent or cloudy was carried out and this was considered as the "compatibility." If the sample is transparent, it means that compatibility is good, but if the sample is cloudy, it means that compatibility is poor.

[Viscosity Measurement]

1 cc of each composition prepared in Reference Examples 1 to 10 described above was collected and then discharged into a measurement cup. The viscosity measurement was carried out under the following conditions using EHD viscometer (manufactured by Toki Sangyo Co., Ltd). The result was considered as the "initial viscosity (Pa·s)" From the viewpoint of workability, a viscosity of the composition is preferably 1,000 to 3,000 mPa·s, and most preferably 1,500 to 2,500 mPa·s. If the viscosity of the composition is within the above range, the composition is preferably spread after applying the composition, and a coated film thickness is likely to be uniform with respect to an adherend. In the case of Reference Examples 1 to 10, if the viscosity is less than 10,000 mPa·s, there is a high probability that the viscosity of the composition becomes 3,000 mPa·s or less.

Measurement Conditions
Cone rotor: 1°×R24
Rotation speed: 10 rpm
Measurement time: 1 minute
Measurement temperature: 25° C. (Temperature is controlled by a constant-temperature bath.)

TABLE 1

| Component | Raw material | Reference Example 1 | Reference Example 2 | Reference Example 3 | Reference Example 4 | Reference Example 5 | Reference Example 6 | Reference Example 7 | Reference Example 8 | Reference Example 9 | Reference Example 10 |
|---|---|---|---|---|---|---|---|---|---|---|---|
| Component (A) | UC-203 | 100 | 100 | 100 | 100 | 100 | 100 | 100 | 100 | 100 | 100 |
| Component (C) | FA-BZA | 50 | | | | | | | | | |
| | L-A | | 50 | | | | | | | | |
| Component (C') | IBX-A | | | 50 | | | | | | | |
| | IB-X | | | | 50 | | | | | | |
| | FA-512M | | | | | 50 | | | | | |
| | HOP-A | | | | | | 50 | | | | |
| | HEMA | | | | | | | 50 | | | |
| | 4HBA | | | | | | | | 50 | | |
| | ACMO | | | | | | | | | 50 | |
| | DMAA | | | | | | | | | | 50 |
| Total | | 150 | 150 | 150 | 150 | 150 | 150 | 150 | 150 | 150 | 150 |
| Compatibility | | Transparent | Transparent | Transparent | Transparent | Transparent | Cloudy | Cloudy | Cloudy | Cloudy | Cloudy |
| Viscosity | | 7500 | 9000 | 24250 | 23750 | 26500 | 15000 | 9000 | 12000 | 19000 | 20000 |

A difference in compatibility between the component (A) and the component (C) or the component (C') was generated due to the structure of the (meth)acrylic monomer that is the component (C) or the component (C'). Moreover, it was also confirmed that, if the compatibility is improved, the viscosity is lowered. In consideration of both of the compatibility and the viscosity, the component (C) each used in Reference Examples 1 and 2 is most preferable.

Examples 1 to 3, and Comparative Examples 1 to 8

The component (A) to the component (C) (in Comparative Examples, the component (B') were used instead of the component (B)) were weighted and stirred for 30 minutes. Thereafter, the component (D) and a photoinitiator were weighted and further stirred for 30 minutes. The detailed preparation amounts were based on the description presented in Table 2 and all numerical values were indicated by part(s) by mass.

TABLE 2

| Component | Raw material | Example 1 | Example 2 | Example 3 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|
| Component (A) | UC-203 | 100 | 100 | 100 | 100 | 100 | 100 | 100 | 100 | 100 | 100 | 100 |
| Component (B) | Poly ip | 500 | 200 | 500 | | | | | | | | |
| Component (B') | LIR-403 | | | | 200 | 200 | 200 | | | | | |
| | Poly BD | | | | | | | 500 | | | | |
| | LIR-30 | | | | | | | | 500 | | | |

TABLE 2-continued

| Component | Raw material | Example 1 | Example 2 | Example 3 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|
| | LIR-50 | | | | | | | | 500 | | | |
| | B-1000 | | | | | | | | | 500 | | |
| | B-3000 | | | | | | | | | | | 500 |
| Component (C) | FA-BZA | 200 | 200 | 200 | 200 | 200 | 200 | 100 | 100 | 100 | 100 | 100 |
| | L-A | 60 | 60 | 60 | 60 | 60 | 60 | 60 | 60 | 60 | 60 | 60 |
| Component (D) | P85 | 350 | 350 | | | 150 | 350 | 350 | 350 | 350 | 350 | 350 |
| | P105 | | | 350 | | | | | | | | |
| Photoinitiator | 184 | 25 | 25 | 25 | 25 | 25 | 25 | 25 | 25 | 25 | 25 | 25 |
| Total | | 1235 | 935 | 1235 | 585 | 735 | 935 | 1135 | 1135 | 1135 | 1135 | 1135 |

With respect to Examples 1 to 3 and Comparative Examples 1 to 8, appearance (before curing) confirmation, appearance (after curing) confirmation, thick film curability measurement, hardness measurement, elongation percentage measurement, cure shrinkage ratio measurement, and appearance confirmation after the moisture resistance test were carried out according to methods described below, and the results thereof were presented together in Table 3.

[Appearance (Before Curing) Confirmation]

A sample was poured into a test tube (a glass apparatus for chemical analysis) having a diameter of 15 mm corresponding to JIS R 3503 or a tube having a shape equal to that of the test tube so as to have a depth of 50 mm or more, and the sample was picked up at eye level. The sample was visually confirmed in the entering direction of light and the dark direction. The confirmation on whether the sample is colorless and transparent, colored and transparent, or cloudy was carried out and this was considered as the "appearance (before curing)." In the present invention, a case where the sample is colorless and transparent is preferable.

[Appearance (After Curing) Confirmation]

50 mg of the composition was added dropwise onto one colorless and transparent soda glass with a dimension of 2.0 mm×50 mm×100 mm, and then the other soda glass was put together therewith. Thereafter, the composition was cured by light at an integrated light amount of 3,000 mJ/cm² and the appearance thereof was visually confirmed. The confirmation on whether the sample is colorless and transparent, colored and transparent, or cloudy was carried out and this was considered as the "appearance (after curing)." In the present invention, a case where the sample is colorless and transparent is preferable.

[Thick Film Curability Measurement]

A circular cylindrical container, which is made of polytetrafluoroethylene (PTFE) and has a hole of 34 mm (inner diameter)×40 mm (height), was provided with a cover on the bottom portion of the container and the container was filled with the composition. The composition was cured by irradiation of light at an integrated light amount of 3,000 mJ/cm² from directly above the container. Thereafter, the cured product was taken out from the container and a non-cured portion was wiped with gauze. Five portions near the center portion of the cured product were measured with a dial gauge and then the average value of the measured values was considered as the "thick film curability (mm)" The thick film curability is preferably 2 mm or more, and more preferably 3 mm or more. Incidentally, all units of numerical values in the following Table 3 are millimeter (mm).

[Hardness Measurement]

The composition was added dropwise to the container to uniformly have a thickness of 6 mm, and was cured by irradiation of light at an integrated light amount of 3,000 mJ/cm² from directly above. The press reference surface of an A-type durometer was pressed against the sample surface with a force of 5 N while the press reference surface was maintained to be parallel to the surface of the cured product and then a maximum value of the durometer was read when the press reference surface brought into close contact with the sample. The maximum value was considered as the "hardness." The hardness is preferably 10 or less.

[Elongation Percentage Measurement]

The composition was cured by irradiation of light at an integrated light amount of 3,000 mJ/cm² to prepare a rectangular test piece of 0.5 mm thick×20 mm wide×150 mm long. The measurement was carried out at an environmental temperature of 25° C. and a tension rate of 50 mm/min using a tension tester (Tensilon, manufactured by ORIENTEC Co., LTD.) and a maximum length until breakage was measured. A numerical value calculated by "(Maximum Length)/(Initial Length)×100" was considered as the "elongation percentage (%)." The elongation percentage is preferably 200% or more, and more preferably 250% or more. Incidentally, all units of numerical values in the following Table 3 are percentage (%).

[Cure Shrinkage Ratio Measurement]

As for a cured product obtained by being cured with light irradiation at an integrated light amount of 3,000 mJ/cm², "Mass in Water (distilled water)" was measured after "Mass in Air" was measured, and then "Specific Gravity of Cured Product" was calculated by Numerical Formula 1. "Specific Gravity of Composition" was measured by a specific gravity cup method, and then "Cure Shrinkage Ratio (%)" was calculated from "Specific Gravity of Composition" and "Specific Gravity of Cured Product" by Numerical Formula 2. In the present invention, the cure shrinkage ratio is preferably 2.0% or less. Incidentally, all units of numerical values in the following Table 3 are percent (%).

[Numerical Formula]

$$\text{"Specific Gravity of Cured Product"} = \frac{\text{"Mass(g) in Air"}}{\text{"Mass(g) in Air"} - \text{"Specific Gravity(g) in Water"}}$$

Numerical Formula 1

$$\text{"Cure Shrinkage Ratio (\%)"} = \frac{\text{"Specific Gravity of Cured Product"} - \text{"Specific Gravity of Composition"}}{\text{"Specific Gravity of Cured Product"}}$$

Numerical Formula 2

[Appearance Confirmation After Moisture Resistance Test]

The same test piece was prepared as in the case of the appearance (after curing) confirmation, and the appearance of the test piece was visually confirmed after the test piece was left to stand still under an atmosphere at 60° C. and 95 RH % (relative humidity) for 1,200 hours. The confirmation on whether the test piece is colorless and transparent, colored and transparent, or cloudy was carried out and this was considered as the "appearance after a moisture resistance test." In the present invention, a case where the test piece is colorless and transparent after the moisture resistance test is preferable.

TABLE 3

| Test item | Example 1 | Example 2 | Example 3 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|
| Appearance (before curing) | Colorless and transparent | Colorless and transparent | Colorless and transparent | Colorless and transparent | Colorless and transparent | Colorless and transparent | Colorless and transparent | Colorless and transparent | Colorless and transparent | Colorless and transparent | Cloudy |
| Appearance (after curing) | Colorless and transparent | Colorless and transparent | Colorless and transparent | Colorless and transparent | Colorless and transparent | Colorless and transparent | Colorless and transparent | Colorless and transparent | Colorless and transparent | Colorless and transparent | Cloudy |
| Thick film curability | 4.0 | 4.0 | 4.1 | 4.2 | 3.8 | 4.0 | 1.0 | 4.2 | 4.2 | 5.0 | 5.0 |
| Hardness | 0 | 0 | 0 | 18 | 10 | 3 | 0 | 40 | 50 | 40 | 50 |
| Elongation percentage | 380 | 276 | 300 | 104 | 138 | 198 | 200 | 90 | 70 | 70 | 60 |
| Cure shrinkage ratio | 1.2 | 1.5 | 1.6 | 2.5 | 2.2 | 1.8 | 1.5 | 1.5 | 1.6 | 1.9 | 1.9 |
| Appearance after moisture resistance test | Colorless and transparent | Colorless and transparent | Colorless and transparent | Colorless and transparent | Colorless and transparent | Colorless and transparent | Colorless and transparent | Colored and transparent | Colored and transparent | Colorless and transparent | Cloudy |

Examples 1 to 3 each using the component (B) had favorable results in terms of the hardness and the elongation percentage, compared to Comparative Examples each using the component (B'). Comparative Example 4 had similar values to Examples 1 to 3 in terms of the hardness and the elongation percentage, but when compared to Examples 1 to 3, Comparative Example 4 had low thick film curability. Therefore, the cured state may be unstable depending on the shape of the adherend. The reason is not clear, but the reason is considered that, although the component (B') of Comparative Example 4 has a hydroxyl group at the terminal, the main skeleton thereof is polybutadiene and thus thick film curability is decreased. Further, in Comparative Examples 5 to 8 each using non-modified polybutadiene or polyisoprene, the composition becomes cloudy or discoloration of the appearance after a moisture resistance test occurs.

Examples 4 to 9

The component (A) to the component (C) were weighted and stirred for 30 minutes. Thereafter, the component (D) and a photoinitiator were weighted and further stirred for 30 minutes. The detailed preparation amounts were based on the description presented in Table 4 and all numerical values were indicated by part (s) by mass. In addition, a ratio (%) of the (meth)acrylate monomer having an aromatic group in the component (C) was also presented together.

Each refractive index of Example 1 and Examples 4 to 9 described above was measured according to methods described below. In addition, appearance (before curing) confirmation, appearance (after curing) confirmation, thick film curability measurement, hardness measurement, and elongation percentage measurement were carried out and the results thereof were presented together in Table 5. The measurement other than the refractive index measurement was carried out in the same manner as described above.

[Refractive Index Measurement]

A refractive index of the composition was measured by D line (589.6 nm) under an atmosphere at 20° C., using an Abbe refractometer. In particular, in a case where a material of the adherend is alkali-free glass to be used in a liquid crystal panel, a refractive index of the composition is preferably 1.510 to 1.525 because a refractive index of the alkali-free glass is 1.51 to 1.52.

TABLE 4

| Component | Raw material | Example 4 | Example 1 | Example 5 | Example 6 | Example 7 | Example 8 | Example 9 |
|---|---|---|---|---|---|---|---|---|
| Component (A) | UC-203 | 100 | 100 | 100 | 100 | 100 | 100 | 100 |
| Component (B) | Poly ip | 500 | 500 | 500 | 500 | 500 | 500 | 500 |
| Component (B') | LIR-403 | | | | | | | |
| | Poly BD | | | | | | | |
| | LIR-30 | | | | | | | |
| | LIR-50 | | | | | | | |
| | B-1000 | | | | | | | |
| | B-3000 | | | | | | | |
| Component (C) | FA-BZA | 260 | 200 | 160 | 130 | 100 | 60 | |
| | L-A | | 60 | 100 | 130 | 160 | 200 | 260 |
| Component (D) | P85 | 350 | 350 | 350 | 350 | 350 | 350 | 350 |
| | P105 | | | | | | | |
| Photoinitiator | 184 | 20 | 20 | 20 | 20 | 20 | 20 | 20 |
| Total | | 1230 | 1230 | 1230 | 1230 | 1230 | 1230 | 1230 |
| Ratio (%) of (meth)acrylate monomer having an aromatic group in the component (C) | | 100 | 77 | 62 | 50 | 38 | 23 | 0 |

TABLE 5

| Test item | Example 4 | Example 1 | Example 5 | Example 6 | Example 7 | Example 8 | Example 9 |
|---|---|---|---|---|---|---|---|
| Appearance (before curing) | Colorless and transparent | Colorless and transparent | Colorless and transparent | Colorless and transparent | Colorless and transparent | Colorless and transparent | Colorless and transparent |
| Appearance (after curing) | Colorless and transparent | Colorless and transparent | Colorless and transparent | Colorless and transparent | Colorless and transparent | Colorless and transparent | Colorless and transparent |
| Thick film curability | 4.3 | 4.0 | 3.2 | 2.6 | 2.0 | 1.0 | 0.8 |
| Hardness | 0 | 0 | 0 | 0 | 0 | 0 | 0 |
| Elongation percentage | 300 | 380 | 400 | 420 | 440 | 440 | 450 |
| Cure shrinkage ratio | 1.5232 | 1.5217 | 1.5160 | 1.5145 | 1.5121 | 1.5089 | 1.5067 |

Example 1 and Examples 4 to 9 each had a refractive index similar to a refractive index of glass as an adherend and were a composition optically suitable for the material. In particular, the refractive index is preferably 1.510 to 1.525 with respect to alkali-free glass to be used in a display panel, and Example 1 and Examples 4 to 7 are considered to be preferable. In addition, as for the thick film curability, the hardness, and the elongation percentage, desirable properties were also confirmed.

In the invention, a cured product is soft but has excellent thick film curability. Accordingly, in the case of a display panel having a complicated structure, no curing defect occurs. In addition, even after the moisture resistance test, the cured product does not become cloudy or is not discolored, which is preferable.

This application is based on Japanese Patent Application No. 2013-046060 filed on Mar. 8, 2013, the entire content of which is hereby incorporated by reference.

The invention claimed is:

1. A photocurable composition comprising components (A) to (D):

the component (A): an isoprene polymer having a (meth)acrylic group, the component (B): an isoprene polymer having a hydroxyl group, the component (C): at least one kind of (meth)acrylate monomers selected from a (meth)acrylate monomer having an aromatic group and an alkyl (meth)acrylate monomer, the component (D): a hydrogenated terpene resin, and the photocurable composition includes 100 to 600 parts by mass of the component (B), 150 to 350 parts by mass of the component (C), and 250 to 450 parts by mass of the component (P) with respect to 100 parts by mass of the component (A).

2. The photocurable composition according to claim 1, wherein a ratio of the (meth)acrylate monomer having an aromatic group in the component (C) is 30 to 100% by mass with respect to the total amount of the component (C).

3. The photocurable composition according to claim 1, wherein a refractive index of a cured product obtained by curing said photocurable composition is 1.510 to 1.525.

4. The photocurable composition according to claim 1, wherein thick film curability is 2 mm or more and an elongation percentage of a cured product obtained by curing said photocurable composition is 250% or more.

5. A sealant comprising the photocurable composition according to claim 1, wherein the sealant is suitable for a display panel having a protection layer made of alkali-free glass.

\* \* \* \* \*